Sept. 3, 1957    H. C. KENDALL ET AL    2,805,335
RESONANT CAVITY RESONATOR
Filed Aug. 19, 1953    3 Sheets-Sheet 1

*INVENTORS*
H.C. KENDALL AND
J.H. AUER JR.
BY Forest B. Hitchcock
THEIR ATTORNEY Sept. 3, 1957  H. C. KENDALL ET AL  2,805,335
RESONANT CAVITY RESONATOR
Filed Aug. 19, 1953  3 Sheets-Sheet 2

INVENTORS
H. C. KENDALL AND
J. H. AUER JR.
BY Forest B. Hitchcock
THEIR ATTORNEY Sept. 3, 1957 H. C. KENDALL ET AL 2,805,335
RESONANT CAVITY RESONATOR Filed Aug. 19, 1953 3 Sheets-Sheet 3

INVENTORS
H.C. KENDALL AND
J.H. AUER JR.
BY *Forest B. Hitchcock*
THEIR ATTORNEY

United States Patent Office 2,805,335
Patented Sept. 3, 1957

2,805,335
RESONANT CAVITY RESONATOR

Hugh C. Kendall and John H. Auer, Jr., Rochester, N. Y., assignors to General Railway Signal Company, Rochester, N. Y.

Application August 19, 1953, Serial No. 375,192

3 Claims. (Cl. 250—36)

This invention relates to apparatus for measuring the speed of moving objects, and more particularly pertains to transmitting and receiving apparatus for measuring the speeds of moving vehicles according to the Doppler frequency shift of a high frequency radio signal.

The apparatus of this invention is especially useful in measuring the speeds of railway cars as they pass through the car retarders of a railway hump classification yard. In such a yard, the cars are pushed over the crest of a hump and then allowed to roll either singly or in "cuts" of two or more cars down the hump and over a plurality of route selecting switches to a particular one of a number of classification tracks selected according to the car's destination.

As each car or cut of cars rolls down the slope of the hump, it passes through a plurality of car retarders, each of which is selectively controllable as to the braking force it exerts on the wheels of each car and also the length of time such force is applied. In this way, the speeds of the cars can be properly controlled so that they will enter their destination tracks at the proper speed and couple to the cars already in such track at a low speed, thereby avoiding damage to the cars and their contents. Systems of this kind wherein the car retarders are automatically controlled according to the weight, destination, and speed of the cars are disclosed in the copending applications of N. C. L. Brown, Ser. No. 359,052, filed June 2, 1953 and of N. B. Coley, Ser. No. 359,069, filed June 2, 1953.

In such systems for automatically controlling the retarder of a car classification yard as disclosed in these prior applications, information as to the speed of the cars as they pass through the car retarders is preferably provided by means of an organization known as an interferometer or continuous-wave radar, one of which is associated with each car retarder. This apparatus includes transmitting and receiving equipment which may be located between the track rails near the exit end of a retarder and is effective to cause a beam of high frequency radio energy to be constantly transmitted toward approaching vehicles. A portion of such transmitted energy is reflected from the approaching vehicle back to the receiving apparatus with a slightly higher frequency than the transmitted signal, and this frequency shift is proportional to the velocity of the approaching car in accordance with the Doppler principle.

By mixing a portion of the transmitted signal with the reflected signal of higher frequency that is received, a beat frequency signal may be extracted whose frequency equals the Doppler frequency. By providing apparatus which is distinctively responsive to the frequency value of this beat frequency signal, the speeds of approaching vehicles are continually and accurately determined. A circuit organization for accomplishing this function is disclosed and claimed in the prior co-pending application of H. C. Kendall and J. H. Auer, Jr., Ser. No. 359,162, filed June 2, 1953. The present application discloses in detail the structure of the transmitting and receiving antennas and their associated reflecting means and frequency determining apparatus used in the system of our prior application above mentioned. Since such prior application disclosed a part of the structure of the transmitting and receiving antennas, this application may be considered as a continuation-in-part of such prior application. However, all claims to the structure common between the two applications are intended to be claimed in this application.

An object of this invention is to provide a reflecting horn common to both transmitting and receiving antennas of an interferometer.

Another object of this invention is to provide a receiving antenna for an interferometer having an associated rectifying means mounted integrally therewith to reduce the effects of stray coupling and losses at the microwave frequency employed.

An additional object of this invention is to provide a common reflecting horn for both transmitting and receiving functions having a jack associated with the receiving antenna into which a plug may be inserted for metering purposes and with said jack so mounted in the reflecting horn with respect to the receiving antenna that improved transmitting characteristics result.

Another object of this invention is to provide a reentrant type cavity resonator for an interferometer organization having improved operating characteristics.

Other objects, purposes, and characteristic features of this invention will in part be obvious from the accompanying drawings and in part pointed out as the description of the invention progresses.

In the description of the invention, reference will be made to the accompanying drawings in which like reference characters designate corresponding parts in the several views and in which.

Figure 1:
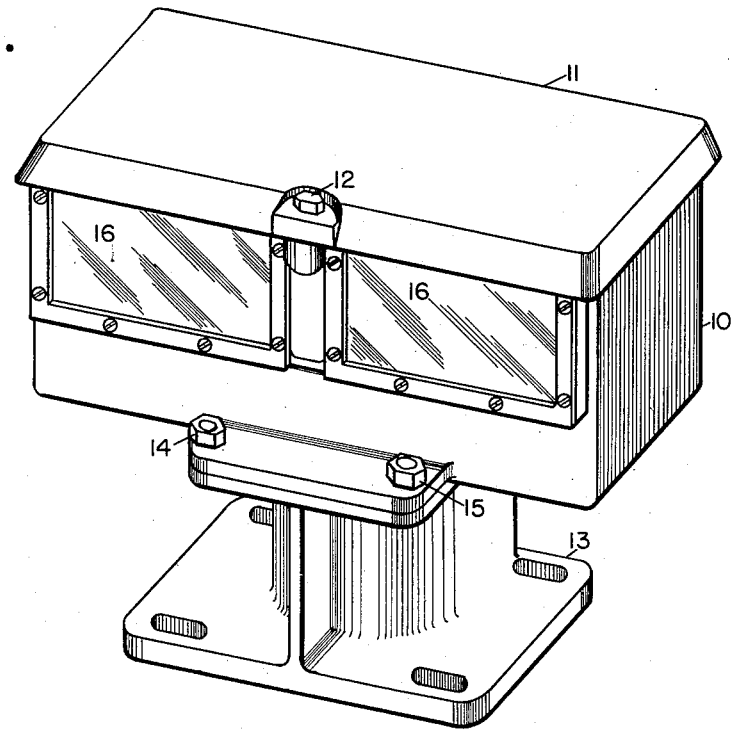
Fig. 1 illustrates the housing in which the transmitting and receiving apparatus of this invention is mounted.
Figure 2:
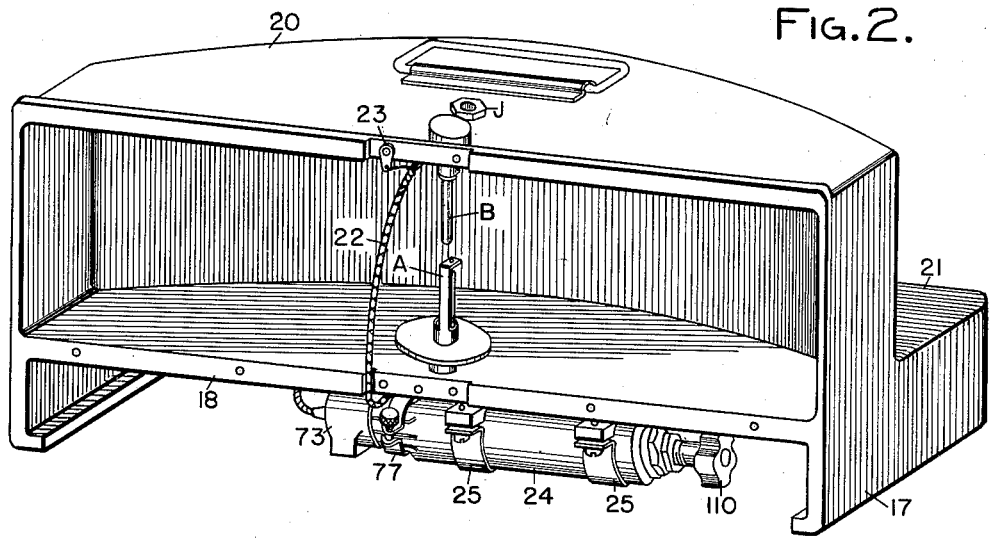
Fig. 2 illustrates the common reflecting horn and the associated transmitting antenna, receiving antenna, and reentrant cavity resonator.

Fig. 1 includes a view of the housing 10 for the apparatus shown on Fig. 2. This housing 10 is provided with a hinged cover 11 which is held in position by the bolt 12. The housing is fastened to the pedestal 13 by means of bolts such as those shown at 14 and 15. The pedestal 13 is fastened to a support which may be positioned between the track rails near the exit end of a retarder, by bolts which pass through the mounting holes shown in the base of this pedestal 13. The casting of which this housing 10 is made is provided with openings over which are placed sheets 16 of a fibrous glass material which is effective to seal the housing against the entrance of dirt and moisture but will still allow high frequency radio energy to be directed out of the housing 10 towards approaching vehicles.

Fig. 2 comprises a view of the common reflecting horn 17 used for both receiving and transmitting antennas. This view also shows the transmitting antenna A and receiving antenna B, both of which are mounted within the space enclosed by the surfaces of the parabolic reflecting horn. On the bottom side of the shelf 18, whose upper surface comprises a portion of the reflecting horn, is mounted, by means of clamps 25, a reentrant type of cavity resonator 24 which provides the high frequency oscillations that are transmitted toward approaching vehicles. A portion of a metering jack J is shown mounted in the upper surface 20.

Figure 4:
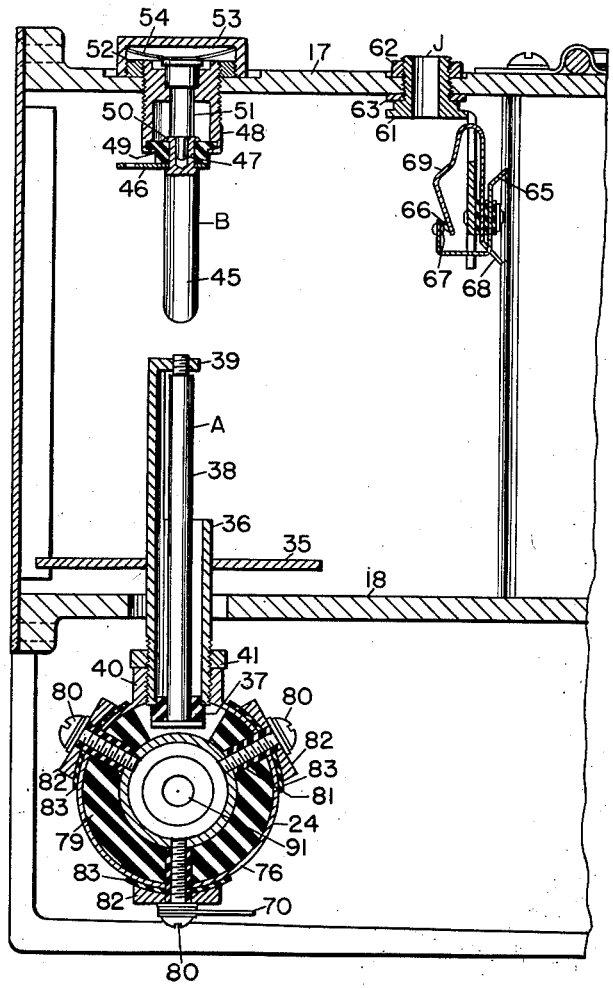
Fig. 4 is an enlarged sectional view of the structure of Fig. 2 showing in detail both transmitting and receiving antennas and the reentrant type cavity resonator.

High frequency energy reflected from a target and intercepted by the receiving antenna B is rectified by a crystal rectifier 51 shown in Fig. 4 and the resulting beat frequency is then transferred over the shielded cable 22 to various other electrical components mounted on the lower surface 18. This shielded cable has its shield grounded by being connected to the terminal 23 which is connected directly to the horn 17. In practice, other electrical components and devices such as electron tubes, transformers, resistors, and the like, may be mounted on the shelf 21 and also on the bottom surface of shelf 18 although these components have not been illustrated in Fig. 2.

Figure 3:
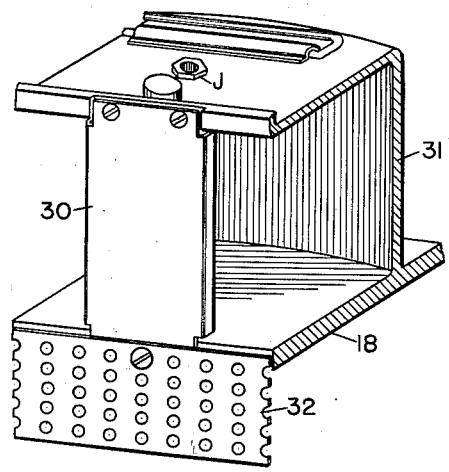
Fig. 3 illustrates a portion of the apparatus of Fig. 2 but with a reflecting shield in place in front of the antennas so as to produce the desired radiation pattern.

Fig. 3 illustrates a portion of the horn of Fig. 2, showing particularly the way in which a reflecting shield 30 is mounted over the front opening of the horn directly in front of the antennas A and B. This reflecting shield 30 prevents high frequency energy from being radiated directly from the transmitting antenna A toward the target. Energy radiated from this antenna A which strikes the reflecting shield 30 is reflected back to the horn and then again reflected from the back surface 31 of the horn, thereby causing energy to be transmitted in the desired pattern along the axis of the parabolic back surface 31. This Fig. 3 also shows the protecting cover 32 in place. This cover is shown removed in Fig. 2 so that the cavity resonator 24 can more clearly be seen.

Fig. 4 is a sectional view of the apparatus shown in Fig. 2. This sectional view is taken on a vertical plane through both the transmitting and receiving antennas A and B, respectively. In this Fig. 4, the transmitting antenna A is shown as comprising what is known as a folded quarter-wave ground plane antenna. The circular disc 35 forming the ground plane is soldered to the sleeve 36. Inside this sleeve 36 is an insulating bushing 37 having a hollow core in which is inserted a probe 38. This probe 38 is threaded at its upper end into the bent over portion 39 of the sleeve 36. The sleeve 36 extends through a clearance hole in the shelf 18 and is threaded into a boss 40 on the cavity resonator 24. The lower end of the probe 38 thus extends directly into the cavity 24 so that high frequency energy is coupled directly to the transmitting antenna A. The amount of coupling of the probe 38 to the cavity 24 is adjustable by rotating the threaded sleeve 36 in the boss 40 so as to vary the amount by which the lower end of the probe extends into the cavity 24. The desired coupling adjustment is maintained by a lock nut 41. The use of a ground plane as provided by the disc 35 permits varying the coupling of the probe to the cavity without varying the distance by which the folded quarter-wave antenna extends above its associated ground plane.

The receiving antenna B is also a quarter-wave antenna with the upper surface of the horn acting as its counterpoise. This antenna comprises a cylindrical radiator 45 having a soldering lug 46 fastened thereto, with the upper end of the radiator inserted into a hole in the insulating bushing 47. The soldering lug abuts against a shoulder 46 are held in place on the end portion of radiator 45 by on the radiator 45. Both insulating bushing 47 and lug spinning over the rim 50 of the radiator 45. The bushing 47 is held in place in the sleeve 48 by causing the rim 49 of the sleeve 48 to be spun over the bushing 47.

The sleeve 48 has its outer surface threaded so as to fit into a threaded hole in the upper surface of the reflecting horn 17. The sleeve 48 is provided with an opening into which fits a crystal rectifier 51, one end of which is seated in a hole drilled into the upper end of the radiator 45. The radiator 45 is, of course, insulated from the sleeve 48 by the insulating bushing 47.

A nut 52, threaded both on the inside and outside, fastens over the upper threaded portion of the sleeve 48 to thereby lock the sleeve in the desired position with respect to the upper surface of the horn 17. A cap 53, threaded on the inside, screws onto the nut 52 and causes a spring 54 to exert pressure on the crystal 51 so that it will be maintained in proper contact with the radiator 45, and also insure that its upper end is connected to the upper surface of the horn 17 which is at ground potential. The signal received by this receiving antenna B and rectified by the crystal rectifier is coupled to an associated preamplifier by means of a connection made to the terminal 46.

A metering jack J is also mounted through the upper surface of the horn 17. This jack is associated electrically with the receiving antenna in such a manner as to permit measuring the current through a resistor (not shown) that is connected in parallel with the crystal rectifier 51. This jack J comprises a bushing 61 which is inserted through a hole in the upper surface of the horn 17, and secured by means of a nut 62 which is screwed onto the outer threaded portion of the member 61 extending above the upper surface of the horn 17. A metal washer 63 may be used, if desired, between the bushing 61 and the bottom surface to prevent rotation of the jack J as the nut 62 is tightened.

A connection made to the terminal 68 is ordinarily completed through the closed contacts 66 and 67 to the terminal 65, which is grounded to horn 17. Such a circuit connection is ordinarily made in series with the above-mentioned resistor so that the current passing through the resistor also passes through the above-described circuit provided by the jack J.

When a plug is inserted through the opening in the bushing 61, the tip of such plug pushes against the spring-like member 69 so as to open the series circuit at contact 66 and 67, and the sleeve of such plug then makes contact with member 61. A current meter having its terminals connected respectively to the sleeve and the tip of such plug will then have flowing through its winding the current desired to be measured. This current will flow through the meter rather than through the previously described circuit provided by the jack which is now open-circuited.

It has been found that the jack J should preferably be located directly behind the receiving antenna B and with a distance between jack and antenna approximating a quarter-wave length of the frequency used in the interferometer system. When these conditions are fulfilled, it is found that the jack J provides the effect of acting as a parasitic element with respect to the receiving antenna. As a result, the apparent gain of the receiving antenna B is increased so that a high output is obtained from the antenna for a given amplitude of reflected signal.

Figure 5:
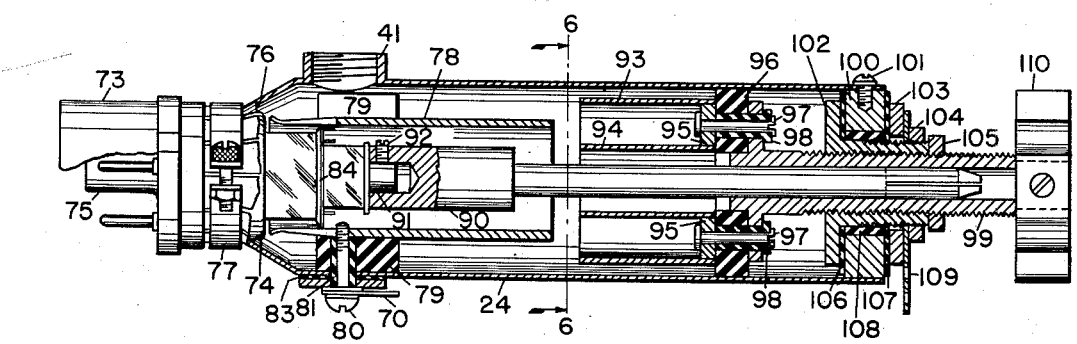
Fig. 5 is a detailed sectional view of the reentrant type cavity resonator.

A sectional view of the reentrant cavity resonator 24 of Fig. 2 is shown in Fig. 5. The theory of operation of the reentrant cavity resonator of this invention will not be described in detail. A resonator of this general type with its associated tube is shown in Fig. 7.1 on page 173 of the book "Klystrons and Microwave Triodes" which comprises volume 7 of the Radiation Laboratory series, published by McGraw-Hill Company. This Fig. 5 shows that the resonator has associated with it an electron tube 75 of the kind commonly known as a lighthouse tube. A plug connector 73 mounted over the tube base facilitates the making of electrical connections to various elements of tube 75. The outer cylindrical shell 76 of the resonator is provided with a plurality of slots at one end, and the resulting tabs are bent inwardly to effectively reduce the diameter of the shell so that it nearly equals the diameter of the metallic cathode cylinder 74 of tube 75. When the lighthouse tube 75 is inserted into the thus restricted end opening of the shell 76, a connection is provided between the shell 76 and cathode cylinder 74 by causing a band 77 to be tightened around such restricted end opening and around the cathode cylinder of a tube 75. A circular grid cylinder 78 also made of a conducting material is supported within the outer shell 76 by means of a ring 79 of an electrically insulating material as shown in the sectional view of Fig. 4 in such a way that it is co-axial with the outer shell 76. This ring of insulating material does not extend entirely around the grid cylinder 78; instead, an empty space is provided at the top opposite the opening provided by the boss 40 to allow the probe 38 to extend into the cavity. The end of the grid cylinder 78 is slotted so as to provide a spring-like tight electrical connection against the metallic grid ring 84 of tube 75.

The grid cylinder 78 is fastened longitudinally along the axis of the resonator 24 by means of screws 80 which pass through the outer shell 76 and into threaded holes in the grid cylinder 78. As shown in Fig. 4, these screws 80 are positioned at 120° intervals about the circumference of the outer shell 76 and are insulated from the outer shell by means of insulating bushings 81. Metal supporting blocks 82 having a curvature on their bottom surface the same as that of the shell 76 are also held in place against the shell by the screws 80. These blocks 82 are electrically insulated from the outer shell 76 by means of square insulating washers 83. A soldering lug 70 is held in place by one of the screws 80 to facilitate the making of an electrical connection through such screw 80 to the grid cylinder 78.

The axial length of the grid cylinder 78 is ordinarily chosen to be equal to about one half the wave length of the desired operating frequency of the resonator. The screws 80 are fastened to the grid cylinder 78 at a position along the axial length of the cylinder where there is a voltage node, i. e., the location at which the voltage is at a minimum.

The insulating material of which the square washers 83 are formed is preferably chosen to have a high dielectric constant. Thus, at the high frequency of operation that is involved, an effective bypass capacitor is formed comprising each block 82 and the shell 76 as plates of the condenser with the respective insulating washer 83 acting as the dielectric material of these capacitors. The ends of the screws 80 that are adjacent the outer shell 78 are thus electrically connected to the shell 76 insofar as the high frequency currents are concerned, but are still insulated from the shell with respect to direct current, thereby allowing the grid cylinder 78 to assume a direct-current potential different than the grounded shell 76. Although each of the screws 80 is of a length that is somewhat less than a quarter wave length of the frequency employed, the effective short circuit between the head of such screw and the shell 76 with respect to the high frequency used in the system causes the other end of each of these screws 80 to present a high impedance to the microwave currents present on the grid cylinder 78. Thus, this organization provides a means for making a direct current connection to the grid cylinder 78 without, at the same time, causing high frequency currents to feed from the cylinder 78 to the shell 76.

A metallic plate rod 90 is provided having a hollow portion which fits over the plate cap 91 of 75. This plate rod is secured to the plate cap 91 by means of the set screw 92.

Figure 6:
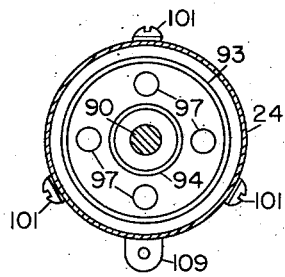
Fig. 6 is a detailed sectional view of the resonator taken at right angles to its longitudinal axis as indicated in Fig. 5.

A shorting plunger comprising two concentric cylinders 93 and 94 is adapted to move longitudinally with respect to the plate rod 90 in a manner to be described. These concentric cylinders 93 and 94 which are shown also in the sectional view of Fig. 6 are soldered to a ring 95, and this assembly is then fastened to a ring 96 of insulating material having a diameter approximately equal to the inner diameter of the shell 76 by means of rivets 97. The rivets 97 also pass through holes in a flanged portion of the shaft 99 so that the cylinders 93 and 94, ring 95 and insulating ring 96 are all fastened as a unit to this shaft 99. The insulating bushings 98 electrically insulate the concentric cylinders and ring 95 from the shaft 99.

The end plate 100 is fastened to the outer shell of the resonator by means of screws 101 which pass through corresponding holes in the shell 76 and into the tapped holes in the end plate 100. A bushing 102 which is threaded over a portion of its outer surface and over the entire length of its inner cylindrical core is held in place with respect to the end plate by means of lock nut 104 which bears against soldering lug 109 and disc 103. A washer 106 of insulating material is provided between the flanged portion of bushing 102 and end plate 100, and a similar washer 107 is provided between the end plate 100 and disc 103. A bushing 108, also of insulating material, is inserted between the metallic bushing 102 and end plate 100 to electrically insulate the grounded shell 76 and end plate 100 from the plate rod 90 and shaft 99 which may have a direct-current voltage applied thereto by means of a connection made to the lug 109.

Rotation of the knob 110 and thus the shaft 99 causes this shaft 99 to move axially relative to the bushing 102. Since the bushing 102 and end plate 100 are fixed in position as a result of the screws 101, rotation of the shaft 99 causes the concentric cylinders 93 and 94 to move axially along the plate rod 90.

The smaller cylinder 94 is connected to the shaft 99 and thus to the plate rod 90 through the insulating ring 96. Thus, it may be considered that a capacitor is formed with the ring 95 and shaft 99 acting as the opposite plates of the capacitor and with the insulating ring 96 forming the dielectric material between the capacitor plates. In this way, the cylinder 94 is electrically connected to the plate rod 90 in so far as the high frequencies of operation of the resonator are considered. According to one possible theory of explanation, it may be considered that the plate rod 90 and inner cylinder 94, being at the same potential as far as high frequency currents are involved, form the inner conductor of a quater wave length coaxial cable with the cylinder 93 forming the outer conductor of such cable.

The axial length of the two concentric cylinders 93 and 94 is chosen to be a quarter wave length of the frequency at which the cavity is to operate. Thus, there is formed a quarter wave length stub with inner and outer conductors shorted at one end through the ring 95. As a result, a very high impedance is presented to high frequency currents at the opposite end of this quarter wave stub, thereby providing an effective termination of the circuit with regard to the operating frequency. Since the position of the cylinders 93 and 94 axially along the plate rod 90 determines the feed back between plate and grid circuits of the tube 75, it is possible to compensate for variations between different tubes 75 by merely rotating the knob 110 so that the desired feedback will be obtained and oscillations at the desired frequency obtained.

A capacitor may also be considered as being formed, comprising the flanged portion of bushing 102 and end plate 100 as plates of the condenser with the insulating washer 106 forming the dielectric material. Consequently, any high frequency currents that do appear at this end of the resonator are shunted to the grounded shell 76. Consequently, these high frequency currents do not pass to the shaft 99 through the threaded connection between bushing 102 and shaft 99. By preventing these high frequency currents from appearing on a shaft 99, it is possible to locate the shaft without causing electrical disturbances that would otherwise effect the operation of the cavity resonator.

The organization provided with respect to the reentrant type of cavity resonator of this invention causes the cylinders 93 and 94 to be connected electrically to the plate rod 90 in so far as the high frequency currents are involved without the necessity of providing a sliding connection between these elements since it has been found that a satisfactory electrical contact cannot be maintained through such a sliding contact. Furthermore, the use of bypass capacitors in the manner shown and described facilitates the tuning of the resonator by eliminating high frequency currents from those locations where there is sliding motion between mating parts.

Having described an interferometer structure and related apparatus as one specific embodiment of this invention, we desire it to be understood that this form is selected merely to illustrate the principles of this invention and that other embodiments, adaptations, and modifications may be employed without departing from the spirit or scope of this invention.

What we claim is:

1. In an interferometer system for measuring the speeds of railway vehicles, a reentrant cavity resonator associated with a lighthouse type electron tube comprising, a cylindrical shell contacting at its one end the cathode connection of said tube, a threaded tuning shaft associated with the plate of said tube and being rotatable with respect to a bushing, said bushing having a flat flanged surface adjacent a corresponding flat surface on an end plate fastened to the other end of said shell, an insulator made of a material having a relatively high dielectric constant being interposed between said adjacent flat surfaces, and means for drawing said adjacent surfaces tightly toward each other to prevent rotation between said surfaces, said adjacent flat surfaces and said interposed dielectric material forming a bypass capacitor to bypass high frequency energy to said shell.

2. In an interferometer system for measuring the speeds of railway vehicles, a reentrant cavity resonator associated with a lighthouse type electron tube comprising, a cylindrical shell contacting at its one end the cathode connection of said tube, a plate rod fastened to the plate connection of said tube and extending along the axis of said shell, a grid cylinder suspended within said shell and contacting the grid connection of said tube, a pair of plate choke cylinders concentric with said shell and adapted to move longitudinally along the axis of said shell, said cylinders being shorted together at their ends most distant from said tube and being capacitively coupled to said plate rod, said plate choke cylinders having a longitudinal length equal substantially to one quarter wave length of the output frequency of said resonator, whereby the position of said cylinders affects the plate-grid feed back of said resonator.

3. In an interferometer system for measuring the speeds of railway vehicles, a reentrant cavity resonator associated with a lighthouse type electron tube comprising, a cylindrical shell contacting at its one end the cathode connection of said tube, a grid cylinder being suspended within said shell concentrically therewith and electrically insulated from said shell, said grid cylinder contacting the grid connection of said tube, a plate rod fastened to the plate connection of said tube and being also concentric with such shell, a threaded shaft adapted to screw into a bushing fastened to the other end of said shell, said shaft being electrically insulated from said shell and having a hollow core adapted to receive said plate rod and provide a sliding connection with respect to said rod, a first plate choke cylinder having a diameter slightly smaller than the inner diameter of said shell, a second plate choke cylinder having a diameter slightly larger than said plate rod, said plate choke cylinders each having a length equal to substantially a quarter wave length of the desired output frequency of said resonator, said plate choke cylinders being connected together at their one end and fastened to said shaft in a position concentric with said shell, insulating means for electrically insulating said plate choke cylinders from said shaft, said open ends of said plate choke cylinders facing said electron tube and being moveable longitudinally along the axis of said shell with respect to said grid cylinder as said shaft is rotated, said concentric plate choke cylinders acting as a shorted quarter-wave line to limit the path of high frequency energy and thereby adjust the plate-grid feed back of said resonator.

References Cited in the file of this patent

UNITED STATES PATENTS

| | | |
|---|---|---|
| 2,474,026 | Atwood et al. | June 21, 1949 |
| 2,520,148 | Johnson | Aug. 29, 1949 |
| 2,539,680 | Wehner | Jan. 30, 1951 |
| 2,555,151 | Noyes | May 29, 1951 |
| 2,556,087 | Iams | June 5, 1951 |
| 2,556,377 | Robertson | June 6, 1951 |
| 2,561,727 | Cooper et al. | July 24, 1951 |
| 2,626,355 | Hoffman et al. | Jan. 20, 1953 |